United States Patent
Brar et al.

(10) Patent No.: US 6,721,088 B2
(45) Date of Patent: Apr. 13, 2004

(54) SINGLE-SOURCE MULTIPLE-ORDER RAMAN AMPLIFIER FOR OPTICAL TRANSMISSION SYSTEMS

(75) Inventors: Khushvinder Brar, Center Velley, PA (US); Clifford Headley, Flemington, NJ (US); Jean-Christopher Bouteiller, Somerset, NJ (US); Jake Bromage, North Plainfield, NJ (US)

(73) Assignee: OFS Fitel, Norcross, GA (US)

( * ) Notice: Subject to any disclaimer, the term of this patent is extended or adjusted under 35 U.S.C. 154(b) by 54 days.

(21) Appl. No.: 10/098,940

(22) Filed: Mar. 15, 2002

(65) Prior Publication Data

US 2003/0174388 A1 Sep. 18, 2003

(51) Int. Cl.$^7$ ................................. H01S 3/00
(52) U.S. Cl. ........................... 359/334; 372/3
(58) Field of Search ............... 359/334; 372/3

(56) References Cited

U.S. PATENT DOCUMENTS

| | | | |
|---|---|---|---|
| 5,323,404 A | * | 6/1994 | Grubb .......................... 372/6 |
| 6,163,552 A | * | 12/2000 | Engelberth et al. ............ 372/3 |
| 6,310,899 B1 | * | 10/2001 | Jacobovitz-Veselka et al. 372/6 |
| 6,407,855 B1 | * | 6/2002 | MacCormack et al. ..... 359/346 |
| 6,426,965 B1 | * | 7/2002 | Chang et al. .................. 372/3 |
| 6,549,329 B2 | * | 4/2003 | Vail et al. .................... 359/334 |
| 6,560,247 B2 | * | 5/2003 | Chang et al. .................. 372/6 |

FOREIGN PATENT DOCUMENTS

JP          11054853 A    *  2/1999   ........... H01S/03/30

OTHER PUBLICATIONS

Qian et al. Fiber Raman amplifications with dispersion compensating fibers. OSA TOPS vol. 44. 2001 pp. 36–43.*

* cited by examiner

Primary Examiner—Thomas G. Black
Assistant Examiner—Deandra M. Hughes
(74) Attorney, Agent, or Firm—Lowenstein Sandler PC

(57) ABSTRACT

In accordance with the invention, an optical fiber communication system comprising a source of optical signal channels and an optical fiber transmission line is provided with one or more single source, multiple-order Raman pumps downstream of the source. Each single source pump provides multiple-order Raman pump light for amplifying the signal channels.

10 Claims, 5 Drawing Sheets

SINGLE-SOURCE MULTIPLE-ORDER RAMAN AMPLIFIER FOR OPTICAL TRANSMISSION SYSTEMS

FIELD OF THE INVENTION

This invention relates to single source, multiple-order Raman effect amplifiers and to optical communication systems employing such amplifiers.

BACKGROUND OF THE INVENTION

Optical fiber transmission systems provide the rapid transmission of vast amounts of information. An optical fiber system comprises, in essence, a source of information-carrying optical signals and an optical fiber transmission line for carrying the optical signals. It may further include a receiver for detecting the signals and demodulating the information they carry. The signals are typically within a wavelength range favorable for propagating within silica optical fibers, and preferably comprise a plurality of wavelength-distinct channels within that range.

The optical fibers are thin strands of glass of composition capable of transmitting optical signals over long distances with very low loss. They are small diameter waveguides having a core with a first index of refraction surrounded by a cladding having a second (lower) index. Light rays which impinge upon the core at an angle less than a critical acceptance angle undergo total internal reflection within the fiber core. These rays are guided along the fiber with low attenuation. Typical fibers are made of high purity silica with Germania doping in the core to raise its index of refraction above the cladding. A fiber transmission line may include many long segments separated by intermediate nodes for adding or dropping signal channels.

Amplifiers are important components in long distance optical transmission systems. Despite significant progress in reducing attenuation in optical fibers, optical signals transmitted through them are attenuated by the cumulative and combined effects of absorption and scattering. Consequently, long distance transmission requires amplification.

Multiple-order Raman amplifiers are advantageous components to achieve the desired amplification. First order Raman amplification is produced by pump light of higher frequency traveling in the same fiber as the signal light. Multiple-order Raman amplification uses even higher frequency light to amplify the first order pump light that amplifies the signal light. Multiple-order amplification can provide a more favorable distribution of signal-amplifying light along the length of the fiber.

On a more technical level, in first order Raman amplification, signal light in a material medium stimulates higher frequency first order pump light to convert to the lower frequency signal light. This produces a gain in the strength of the signal light.

FIG. 1 schematically illustrates the first order conversion process. A molecule absorbs a photon at frequency $f_p$, and is excited up to a non-resonant (virtual) level. The molecule decays to a lower energy state emitting a signal photon at a lower frequency $f_s$ in the process. The energy difference between the pump and the signal photons is dissipated by the molecular vibrations of the medium. The molecular vibration energy levels of the fiber determines the frequency dependence of the gain. FIG. 2 illustrates the spectral gain curve for germania doped silica.

A given signal frequency $f_s$ in a fiber will be amplified by a higher frequency pump $f_p$ with the amount of gain dependent on the frequency difference $(f_p-f_s)$ called the Stokes shift. The Stokes shift for which $f_s$ is maximally amplified is called the first order Stokes shift, and significant amplification typically occurs over the range of Stokes shifts between 1/2 the first order shift and 3/2 the first order shift. The first order Stokes shift in Germania-doped silica fibers is about 13 terrahertz (THz).

An advantage of first order Raman amplification over conventional optical amplification is that Raman amplification occurs along a length of transmission fiber rather than at the location of a specific component. This permits amplification to take place well upstream of the pump before the signal has suffered irrecoverable attenuation and distortion. Nonetheless much of the first order pump energy is consumed within a short distance of entering the transmission fiber.

A multiple-order Raman amplifier uses yet higher frequency pump light (e.g., a second order pump) to amplify the first order pump light. FIG. 3 is a qualitative spectral diagram showing how the second order Raman pump can amplify the first order pump which, in turn, amplifies the signal light.

One advantage of adding a second order pump is that one can better control the distribution of first order pump energy along the length of the transmission fiber. This permits enhancing amplification even further upstream from the first order pump source. FIG. 4 is a graphical illustration showing the evolution of signal power in three different Raman amplification arrangements. Curve 1 shows the evolution of signal power with position in a fiber including counter propagating first order pump light. Curve 2 shows the effect of adding co-propagating second order pump light, and curve 3 shows the effect if the second order pump light is counterpropagating. As can be seen, multiple-order pumping enhances amplification away from the pump source. The structure and operation of multiple-order Raman amplifiers are described in greater detail in U.S. Pat. No. 6,163,636 issued to A. J. Stentz, et al. on Dec. 19, 2000, which is incorporated herein by reference.

The cost of light sources is a major portion of the cost of amplifiers in fiber optic communication systems and a significant portion of the cost of the system. While Raman amplifiers have important quality advantages over conventional rare-earth doped fiber amplifiers, rare-earth amplifiers require only one pump source. Multiple-order Raman amplifiers, in contrast, have typically required separate sources for the first and second order pumps. As a consequence, increased cost has been an impediment to expanded use of high quality multiple-order Raman amplification.

SUMMARY OF THE INVENTION

In accordance with the invention, a multiple-order Raman amplifier comprises a single source, multiple order Raman pump source, a length of optical fiber and a coupler for injecting the pump light into the fiber. An optical fiber transmission system comprising a source of optical signal channels and an optical fiber transmission line is provided with one or more single source, multiple-order Raman amplifiers. Each single source pump provides multiple-order Raman pump light for amplifying the signal channels.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are to illustrate the concepts of the invention and, except for the quantitative graphs, are not to scale.

DETAILED DESCRIPTION

Figure 1:
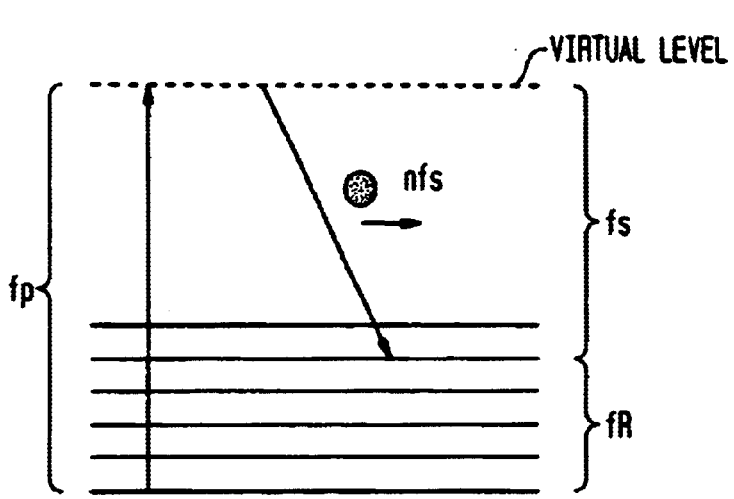
FIG. 1 is a schematic diagram of Raman scattering.
Figure 2:
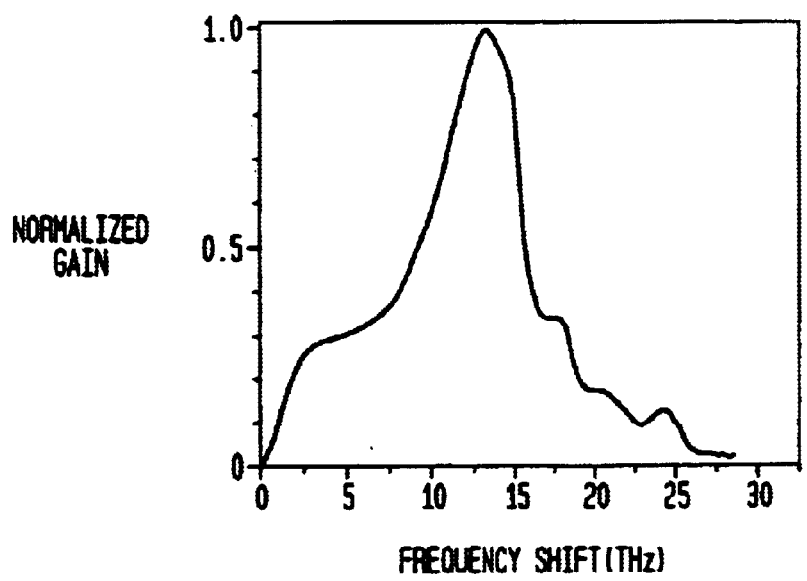
FIG. 2 is a graphical plot showing the normalized Raman gain spectrum in a Germania-doped silica fiber.
Figure 3:
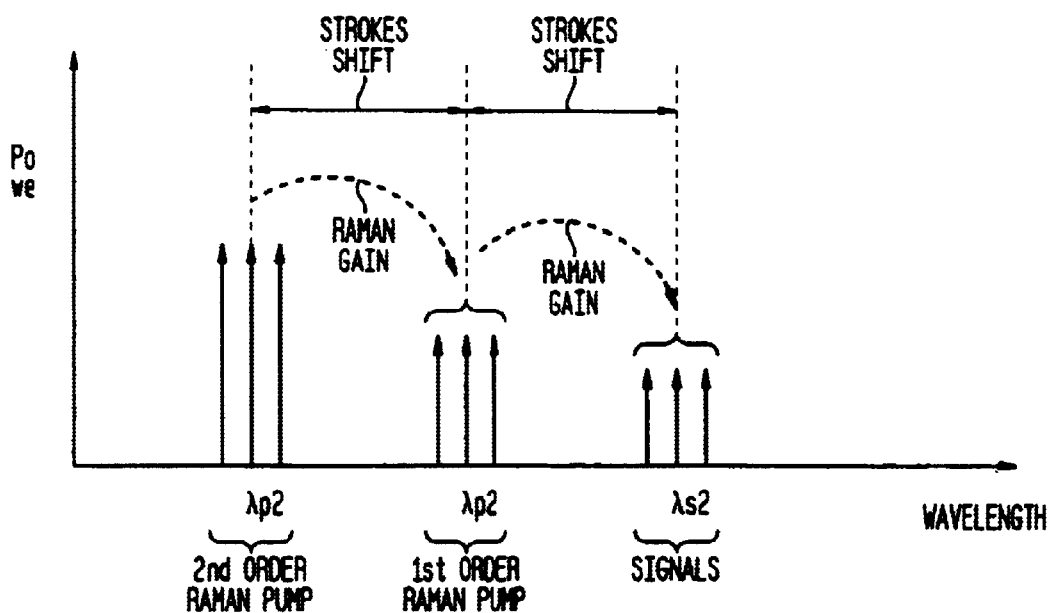
FIG. 3 is a schematic diagram illustrating multiple order Raman pumping.
Figure 4:
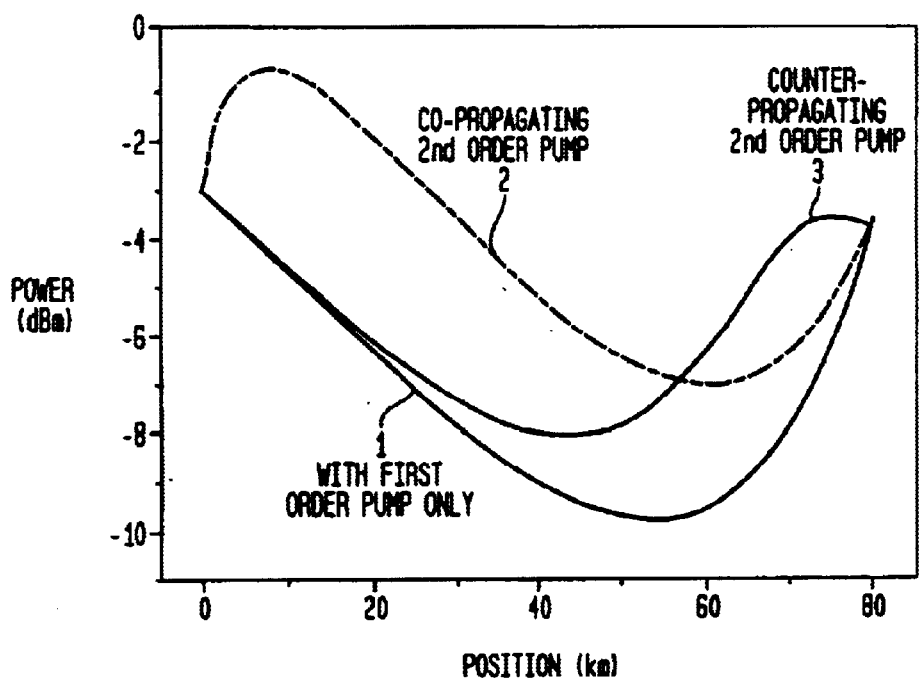
FIG. 4 is a graphical illustration showing the evolution of transmission signal power with distance in three different Raman amplification arrangements.
Figure 5:
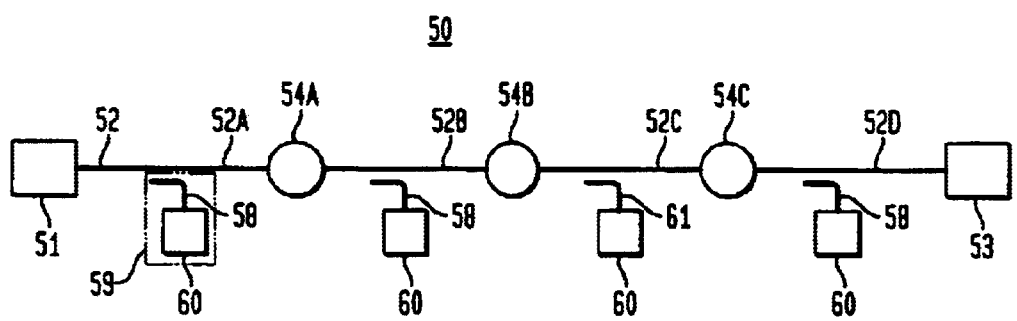
FIG. 5 is a schematic diagram of an optical fiber transmission system provided with single-source, multiple-order Raman pumps.

Referring to the drawings, FIG. 5 schematically illustrates an optical fiber transmission system 50 provided with one or more Raman amplifiers 59 each comprising a single-source, multiple-order Raman pump source 60. By single-source, multiple-order Raman pump source it is meant that a single primary source of light (e.g. a single laser medium) provides the light for multiple-order Raman pumping. Each amplifier 59 comprises a source 60 a length of fiber 52 and a coupler 58 for injecting light from the source into the fiber 52. The transmission system 50 comprises an optical signal source 51 of information-carrying optical signals and an optical fiber line 52 for carrying the signals. The system 50 typically transmits signals to an optical receiver 53. The fiber line 52 can comprise a plurality of optical fiber segments 52A, 52B, . . . , 52D. The segments can be interconnected at a plurality of nodes 54A, 54B, . . . , 54D. Typically signal channels can be added or dropped at the nodes.

The signal source 51 can comprise one or more modulated lasers or light emitting diodes for providing a plurality of modulated wavelength distinct optical signals for a wavelength division multiplexed (WDM) optical system. The signals can be modulated as by pulse position modulation or pulse duration modulation.

The transmission line 52 can comprise one or more segments of telecommunication fiber, and the nodes can be anyone of a variety of add/drop nodes known in the art for WDM systems. Disposed along the line 52 downstream from the signal source are one or more Raman amplifiers 59 comprising single source, multiple-order Raman pumps 60. Advantageously a plurality of sources 60 are distributed along the length of line 52 intermediate the ends of continuous fiber segments 52A, 52B, . . . 52D. Each single source, multiple order pump 60 generates multiple order Raman pump light from the light of a single laser. The multiple order pump light is injected into the transmission line 52 as by a coupler 58 such as a multiplexer. Advantageously the pump 60 generates first order Raman pumping light for amplifying the signal light and second order Raman pumping light for amplifying the first order pumping light. The first order pump light is advantageously directed upstream to counterpropagate with respect to the communication signal light from transmitter 51. Counterpropagation reduces pump-mediated cross-talk.

Figure 6:
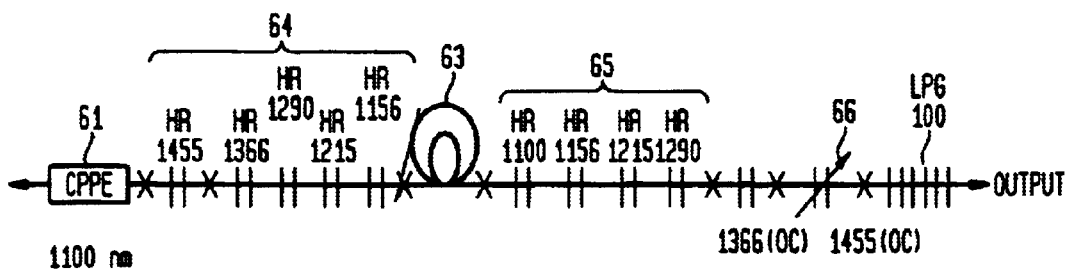
FIG. 6 schematically illustrates a single-source, multiple-order Raman pump useful in the embodiment of FIG. 5.

FIG. 6 illustrates an exemplary single source, multiple-order Raman pump source 60 useful in the system 50. The pump 60 is advantageously a cascaded Raman fiber laser (CRFL) comprising a single source 61, such as a Ytterbium-doped cladding pumped fiber laser (CPFL), coupled into a multiple wavelength cascaded Raman resonator (CRR) 62. The CRR 62 comprises, in essence, a length of optical fiber 63 including a set of upstream highly reflective refractive index gratings 64, a set of downstream refractive highly reflective index gratings 65 and a length of fiber 63 disposed between the upstream and downstream sets. One or more adjustable reflectivity gratings 66 are provided as output couplers for selecting output wavelengths. Each refractive index grating has a center wavelength and a reflectivity at the center wavelength. The CRR is adapted, by choice of the center wavelengths and reflectivities, for receiving radiation from single source 61 and providing output radiation of plural wavelengths each longer than the wavelength of the single source 61. Further details concerning the structure and operation of CRFLs are set forth in U.S. Pat. No. 6,163,552 issued to J. W. Engelberth et al. on Dec. 19, 2000, which is incorporated herein by reference.

For use in the system of FIG. 5, the CRFL is adapted to generate from the single source 61, a plurality of output wavelengths which are multiple order Raman pump wavelengths for pumping the signal light. With the grating center wavelengths annotated in FIG. 6, the exemplary CRFL is adapted to generate multiple order Raman wavelengths. The device will simultaneously lase at a first narrow wavelength range (for first order Raman amplification of a signal wavelength) and at a second wavelength range for Raman amplification of the first range ("second order Raman amplification").

Figure 7:
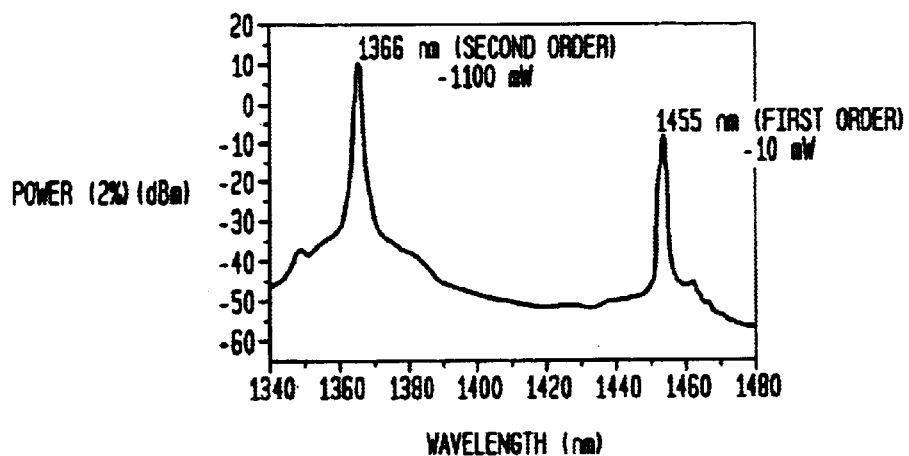
FIG. 7 graphically illustrates the output spectrum of the single source pump of FIG. 6.

As a specific example, an exemplary single-source, multiple-order Raman pump source comprises a cladding-pumped fiber laser (CPFL) that pumps a dual order Raman fiber laser (RFL). The CPFL can be a 1100 nm Yb doped CPFL. The RFL can include 600 m of fiber doped and dimensioned to enhance the Raman effect. Nested pairs of fiber Bragg gratings (FBGs) at 1156, 1218, 1290, 1366 and 1455 nm form laser cavities that convert the input radiation to the desired output wavelengths. All of the FBGs on the input set are high reflectors (reflectivity>99%). On the output set of gratings the FBGs from 1100 nm (pump reflector) to 1290 nm are high reflectors. The 1366 nm FBG has a reflectivity of 8% while the 1455 nm output coupler is tunable from 4 to 12%, which allows light at these wavelengths to escape from the cavity. The relatively small amount of power required at 1455 nm would require this cavity to operate near its threshold which would lead to very unstable lasing. The RFL is therefore run with higher than needed powers at 1455 nm with a variable attenuator, such as long period grating 100, used to attenuate the light. The tunable output coupler at 1455 nm allows its power to be varied relative to the 1366 nm power. FIG. 7 is a plot of the output spectrum of the FIG. 6 source.

The advantages of using single source, multiple order Raman amplification system 50 are manyfold. Each multiple order source requires but one lasing medium to provide multiple order outputs. This saves substantial cost in reducing the number of lasers, laser pumps, and laser heating controls along the system. Other advantages can be seen by comparison of the FIG. 5 system with a comparable system using first order Raman pumping, e.g. one using three first order pump wavelengths optimized for uniform gain.

Figure 8:
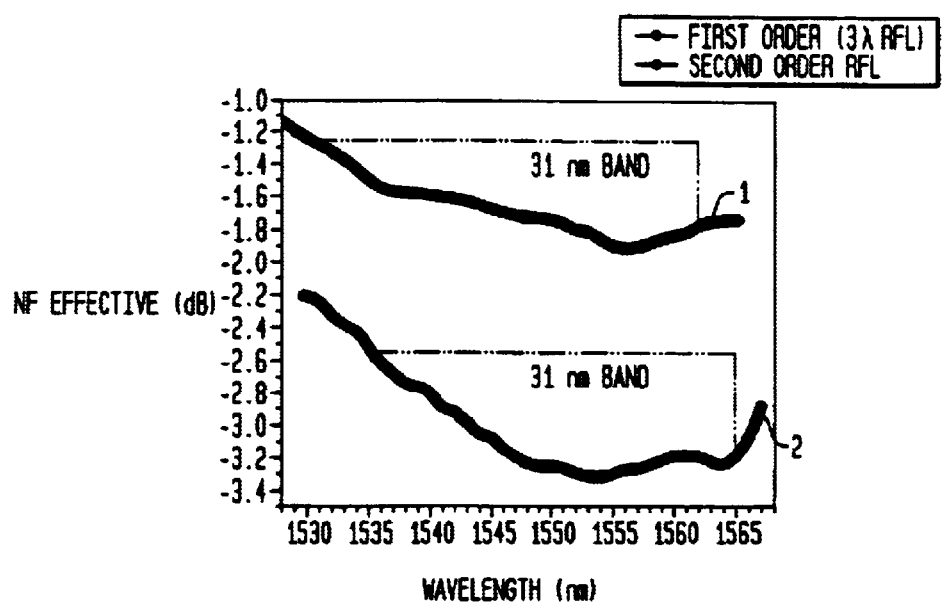
FIG. 8 compares the effective noise figure of a Raman pump using the FIG. 6 single-source pump with the noise figure produced by a reference optimized first order pump.

FIG. 8 compares the noise figure (NF) of the FIG. 5 system with the noise figure for the optimized three wavelength first order pump. Curve 1 shows the NF for the optimized first order pump. Curve 2 shows the NF for the FIG. 5 system. The improvement in NF is at least 1.5 dB.

Figure 9:
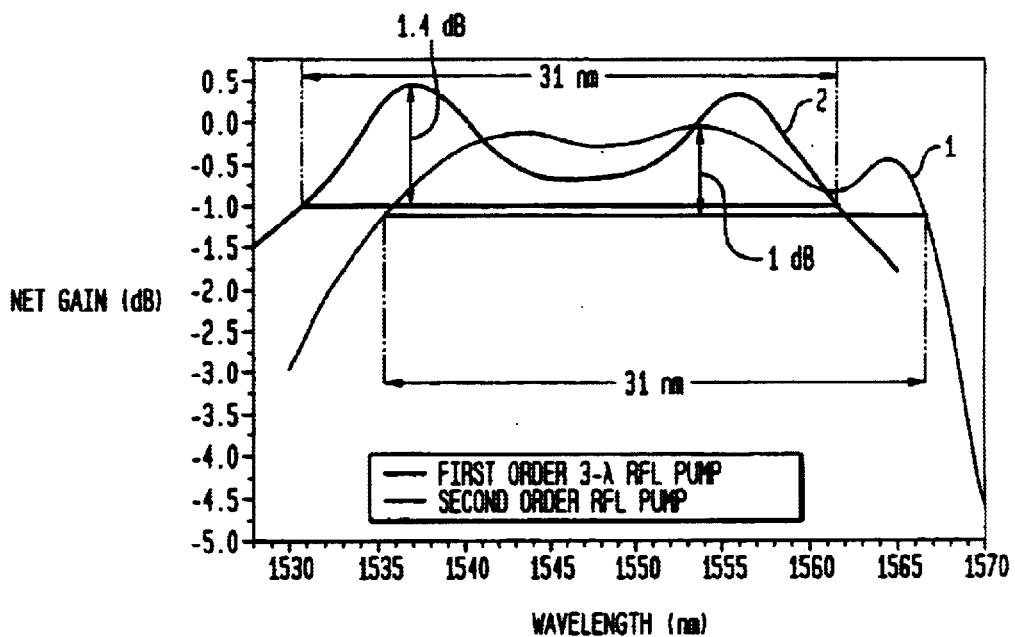
FIG. 9 compares the spectral net gain of a Raman pump using the FIG. 6 single source pump with the reference first order pump.

FIG. 9 compares the gain ripple of the FIG. 5 system (curve 1) with that obtainable from the optimized first order pump (curve 2). The gain ripple is improved across comparable bandwidth. Maximum bandwidth of the FIG. 5 system is obtained with a slight shift off the peak of the Raman gain curve.

It is understood that the above-described embodiments are illustrative of only a few of the many possible specific embodiments, which can represent applications of the invention. Numerous and varied other arrangements can be made by those skilled in the art without departing from the spirit and scope of the invention.

We claim:

1. A single-source, multiple-order Raman pump source comprising:
   a cascaded Raman fiber laser comprising a single laser light source coupled into a multiple wavelength cascaded Raman resonator, said cascaded Raman resonator comprising an optical fiber, said optical fiber including a set of upstream reflective gratings, a set of downstream reflective gratings, a length of fiber between the upstream and downstream sets of gratings, and one or more adjustable reflectivity gratings for coupling output from the resonator, each grating having a center wavelength and a reflectivity at the center wavelength;
   wherein the center wavelengths of the grating are chosen to generate from the single light source a first optical output in a first wavelength range and a second optical output in a second wavelength range that provides Raman amplification of the first optical output; and
   wherein at least one of said downstream reflective gratings has a reflectivity of about 8% and at least one of said one or more adjustable reflectivity gratings has a reflectivity that is tunable from about 4% to about 12%.

2. The pump source of claim 1 wherein the first optical output is at a wavelength range about 1455 nm and the second optical output is at a wavelength range about 1366 nm.

3. A multiple order Raman amplifier for amplifying an optical signal comprising:
   a single source, multiple order Raman pump source according to claim 1 for generating multiple order Raman pump light from a single primary light source.

4. The pump source of claim 1 further comprising an optical attenuator for reducing the output intensity at above-threshold operation.

5. An optical fiber transmission system comprising:
   a source of optical information-carrying signals;
   an optical fiber transmission line optically coupled to the source for transmitting the optical signals; and
   at least one multiple order Raman amplifier optically coupled to the transmission line for amplifying the optical signals, the amplifier comprising at least one single-source, multiple-order Raman pump source according to claim 1 for generating multiple order Raman pump light from a single primary light source.

6. The transmission system of claim 5 wherein the Raman amplifier is coupled to the transmission line to direct light from the single-source pump in a direction upstream of the transmitted optical signals.

7. The transmission system according to claim 5 further comprising a receiver downstream of the amplifier.

8. The transmission system of claim 5 wherein the optical signals are carried in an optical channel in a wavelength range about 1550 nm and the single source pump provides first order pump light in a wavelength range about 1455 nm and second order pump light in a wavelength range about 1366 nm.

9. The amplifier of claim 3 further comprising a variable attenuator to control the output power of the pump source.

10. The amplifier of claim 3 wherein the pump source provides first order pump light in a wavelength range about 1455 nm a and second order pump light in a wavelength range about 1366 nm.

* * * * *